United States Patent Office 3,718,595

Patented Feb. 27, 1973

3,718,595

METHOD OF IMPROVING THE PIEZOELECTRIC PROPERTIES OF CERAMICS

Sadayuki Takahashi and Norio Tsubouchi, Tokyo, Japan, assignors to Nippon Electric Co., Ltd., Minato-ku, Tokyo, Japan

No Drawing. Filed Mar. 20, 1972, Ser. No. 236,491
Int. Cl. C04b *35/46, 35/48*
U.S. Cl. 252—62.9 14 Claims

ABSTRACT OF THE DISCLOSURE

Piezoelectric properties of ceramics of the type $Pb(Li_{1/4}M_{3/4})O_3$-$PbZrO_3$-$PbTiO_3$ (where M is either Nb, Ta or Sb), $Pb(Fe_{1/3}Nb_{2/3})$-$PbZrO_3$-$PbTiO_3$ (where M is either Nb or Sb), $Pb(Ni_{1/3}Nb_{2/3})O_3$-$PbZrO_3$-$PbTiO_3$ and $Bi(Li_{1/2}M_{1/2})O_3$-$PbZrO_3$-$PbTiO_3$ (where M is either Nb, Ta or Sb) are improved by thermally diffusing Cr in said ceramics whereby to provide an average amount by weight of about 0.05 to 0.5% $Cr_2O_3$ therein.

This invention relates generally to a method of obtaining piezoelectric ceramics in which mechanical strength against a bending force is large, the mechanical quality factor ($Qm$) is small, and the electromechanical coupling coefficient ($Kr$) is large. Such ceramics are suitable for use as piezoelectric elements in wideband wave filters.

The value of $Kr$ of piezoelectric element is an important factor when determining the bandpass width of the filter. The bandpass width can be increased by increasing $Kr$, but to a limited value. Namely, the value of $Kr$ cannot be larger than 1. For this reason, a ceramic filter or a mechanical filter using a piezoelectric element as its transducer has hitherto been limited in use over a relatively narow band. For wideband applications, it is the practice to use an LC filter.

Since the recent trend has been to reduce markedly the size of communications equipment, the need for smaller size filters has become quite apparent. In this connection, it has become essential to provide mechanical or ceramic filters for use in wideband applications. Under the circumstances, the piezoelectric element is expected to have a reduced $Qm$ value. The specific bandwidth (B) of a ceramic filter is expresed by the following equation:

$$B \leq \frac{1}{\gamma} + \frac{1}{Qm}$$

(where $\gamma$ is the capacitance ratio).

The capacitance ratio $\gamma$ is dependent on the value of $Kr$. The larger the value of $Kr$, the smaller becomes the value of $\gamma$. Practically speaking, the $Kr$ of the piezoelectric element has already reached its maximum available value, and it is difficult to realize a smaller capacitance ratio $\gamma$; whereas, there is no limitation as to smaller values of $Qm$. Hence, to obtain a wideband filter having an increased specific bandwith (B), it is necessary to reduce the value of $Qm$.

Ceramic compositions of $PbZrO_3$-$PbTiO_3$, $Pb(Mg_{1/3}Nb_{2/3})O_3$-$PbZrO_3$-$PbTiO_3$ and $Pb(Ni_{1/3}Nb_{2/3})O_3$-$PbZrO$-$PbTiO_3$ systems, as well as ceramic compositions of the same systems as these with certain additive elements, exhibit large $Kr$ values above 50%. On the other hand, there are difficulties in satisfactorily reducing the value of $Qm$. For example, when $Qm$ is smaller than 80, the value of $Kr$ is accordingly small.

While $PbNb_2O_6$ is known as a compound whose $Qm$ is as small as about 10; its $Kr$ value, on the other hand, is too small and this compound also is impractical for use as a wideband filter element.

It has previously been found by one of the inventors herein that the value of $Qm$ can be reduced by injecting or incorporating an impurity into the $PbZrO_3$-$PbTiO_3$ system ceramics by thermal diffusion following formation of the system. (Ref: M. Takahashi and S. Takahashi; Japan J. Appl. Phys. 9 (1970) (1006.)

Table 1 below, for example, shows by way of comparison the results of a set of experiments on a ceramic body expressed in terms of $Pb(Zr_{0.52}Ti_{0.48})O_3$. Some of the ceramic samples were produced by adding $CR_2O_3$ as one of the raw materials; while other samples contained $Cr_2O_3$ which was injected or incorporated therein after production of the ceramics.

TABLE 1

| | Density (gr./cm.³) | $Kr$ | $Qm$ | Dielectric constant ($\epsilon$) |
|---|---|---|---|---|
| No impurity | 7.30 | 0.49 | 240 | 1,270 |
| Additive of 0.05 weight percent $Cr_2O_3$ | 7.58 | 0.61 | 720 | 1,015 |
| Injection of 0.05 weight percent $Cr_2O_3$ | 7.41 | 0.35 | 80 | 730 |
| Additive of 0.3 weight percent $Cr_2O_3$ | 7.60 | 0.41 | 680 | 720 |
| Injection of 0.3 weight percent $Cr_2O_3$ | 7.52 | 0.25 | 65 | 430 |

As shown in Table 1, the value of $Qm$ can be reduced by injecting or incorporating $Cr_2O_3$ into the $PbZrO_3$-$PbTiO_3$ system ceramics after the system is produced. At the same time, however, the value of $Kr$ is also reduced. Namely, this ceramics is not suited for wideband filter element.

THE INVENTION

The ceramic materials improved according to this invention are highly practical for use as the piezoelectric element for wideband filters; with the $Kr$ more than 50% and with the $Qm$ factor less than 30.

The present invention uses, as base ceramics, $Pb(Li_{1/4}M_{3/4})O_3$-$PbZrO_3$-$PbTiO_3$ (where M is either Nb, Ta or Sb), $Pb(Fe_{1/3}M_{2/3})O_3$-$PbZrO_3$-$PbTiO_3$ (where M is either Nb or Sb), $Pb(Ni_{1/3}Nb_{2/3})O_3$-$PbZrO_3$-$PbTiO_3$ and $Bi(Li_{1/2}M_{1/2})O_3$-$PbZrO_3$-$PbTiO_3$ (where M is either Nb, Ta or Sb), in which systems part of Pb (up to 15%) may be replaced by Sr, Ba or Ca. As the accessory ingredient, 0.05 to 0.5 weight percent $Cr_2O_3$ is used, which is incorporated into the base ceramics by thermal diffusion.

The base ceramics used in this invention may be produced by well known methods. By way of example, they are produced by weighing and mixing the starting materials, calcining the mixture at about 700 to 1000° C. in an oxidizing or inert atmosphere such as in air or nitrogen for a time more than 30 minutes, crushing the calcined mixture, forming the mixture into a desired shape under a pressure of more than about 100 kg./cm.²; sintering the mixture at about 1000 to 1300° C. in an oxidizing or inert atmosphere for about 30 minutes to 10 hours, and then cooling the sintered body to room temperature. In this process, the calcining may be omitted.

Chromium can be thermally diffused into the base ceramics either from a solid phase or a vapor phase. Typically, $Cr_2O_3$ can be used as a solid source material of the Cr diffusion. In one example, a paste consisting of $Cr_2O_3$ powder and a binder is applied to the surface of the base ceramic body. Alternatively, the base ceramic body is buried in a powder of $Cr_2O_3$ or in a powder of $Cr_2O_3$ and $Al_2O_3$, or sandwiched between two $Cr_2O_3$ plates. Whatever the form, the base ceramic body and $Cr_2O_3$ powder or plate is heated at about 900 to 1300° C. in an oxidizing or inert atmosphere to effect the thermal diffusion of Cr into the base ceramic body. It is believed that the oxygen atoms are at the same time diffused into the ceramic body whereby $Cr_2O_3$ is finally incorporated in the ceramic body. The source of diffused oxygen atoms may be $Cr_2O_3$ and/or the atmosphere if the oxidizing atmosphere is used. Thermal diffusion of Cr from vapor phase may be carried out, for example, by use of $CrCl_3$ in vapor form at about 800 to 1300° C. in an atmosphere containing oxygen.

The diffusing process should be continued until the desired average amount of $Cr_2O_3$ is obtained in the base ceramic body, that is, until the $Cr_2O_3$ in the ceramics reaches a value of 0.05 to 0.5% by weight of the base ceramics. When an amount of the source of Cr diffusion is controlled to a limited value and the thermal diffusion is continued for a sufficient period of time, $Cr_2O_3$ is uniformly contained everywhere in the base ceramic body, otherwise, the $Cr_2O_3$ content tends to be locally high at the part of the base ceramic body near the surface thereof and low at the part remote from the surface. In this case, it is preferred that the local content of $Cr_2O_3$ be more than 0.001 weight percent at the part where the $Cr_2O_3$ content is lowest and less than 0.5 weight percent at the most dense part.

In order to reduce the size of the filter, the size of the piezoelectric element must be reasonably small. Piezoelectric elements thinner than 0.1 mm. are often required. Since the mechanical strength against bending (or the deflective strength) of the ceramic materials can be more than 1500 kg./cm.$^2$ according to this invention, the ceramic materials are unbreakable when they are shaped into a thin plate.

The improved ceramic materials produced according to this invention are highly suitable for use as small size, wideband filter elements and are capable of a broad range of applications.

DETAILS OF THE INVENTION

As illustrative of this invention, the following examples are given:

Example 1

Unless otherwise stated, the starting materials of the base materials used were lead monoxide (PbO), calcium carbonate ($CaCO_3$), strontium carbonate ($SrCO_3$), barium carbonate ($BaCO_3$) lithium carbonate ($Li_2CO_3$), niobuim oxide ($Nb_2O_5$), tantalum oxide ($Ta_2O_5$) and antimony oxide ($Sb_2O_3$), in powder form. Chromic oxide was thermally diffused into the base ceramics produced from the foregoing materials.

The powders were weighed in accordance to the composition desired and mixed together with pure water or alcohol. The mixed powder was dried and calcined at a temperature of about 700 to 900° C. in air for one hour. The sample was crushed and a small amount of water added following which the crushed material was pressed at 700 kg./cm.$^2$ and formed into a disc with a diameter of 20 mm., then sintered at about 1100 to 1300° C. in air for one hour, and cooled to room temperature. The $Cr_2O_3$ powder was kneaded with a small amount of water and applied to the surface of the sample ceramics. For injection of $Cr_2O_3$ thereinto by thermal diffusion, the samples were subjected to heat treatment at about 1000 to 1200° C. in air for 0.5 to 2 hours. The amount of $Cr_2O_3$ diffused therein was measured by the extinction light intensity method. Part of the sample ceramics was used for the purpose of measuring the mechanical strength against bending (hereinafter referred to simply as "mechanical strength"). The measurement was based on the method disclosed in "Relation Between Sintering Temperature and Structural Characteristics of Ceramics for Circuit Elements" by Ichiro Ida et al. [Electrical Communication Laboratory, Nippon Telephone and Telegraph Corporation, Research Application Report Vol. 16, No. 6 (1967), pp. 1149–1174]. The rest of the sample ceramics was polished to a thickness of 1 mm. Silver electrodes were attached to the samples by baking, and a DC field of 5 kv./mm. was applied to the samples at 100° C. for one hour as a poling treatment.

After storing the samples for more than 24 hours, the $Kr$ and $Qm$ factors were measured. Unless otherwise stated, the measured results hereinafter shown are derived from samples produced and treated in the same manner as described for Example 1.

Table 2 shows the measured results of $Kr$, $Qm$ and the mechanical strength (deflective strength) of the samples obtained from ceramics expressed by the formula $$(Pb_{1-t}M'_t)\{(Li_{1/4}M_{3/4})_uZr_vTi_w\}O_3$$

(where M is either Nb, Sb, or Ta, and M' is either Ca, Sr, or Ba; $u+v+w=1$), into which $Cr_2O_3$ is incorporated by thermal diffusion.

TABLE 2

| Sample No. | M' | t | M | u | v | w | Amount of $Cr_2O_3$ incorporated (x wt. percent) | Kr (percent) | Qm | Mechanical strength (kg./cm.$^2$) |
|---|---|---|---|---|---|---|---|---|---|---|
| 1.1* | | | Nb | 0.10 | 0.42 | 0.48 | 0 | 53 | 105 | |
| 1.2 | | | Nb | 0.10 | 0.42 | 0.48 | 0.1 | 54 | 25 | |
| 1.3* | | | Nb | 0.20 | 0.46 | 0.34 | 0 | 51 | 128 | |
| 1.4 | | | Nb | 0.20 | 0.46 | 0.34 | 0.15 | 51 | 30 | |
| 1.5* | | | Nb | 0.20 | 0.37 | 0.43 | 0 | 55 | 90 | |
| 1.6 | | | Nb | 0.20 | 0.37 | 0.43 | 0.15 | 56 | 18 | |
| 1.7* | | | Nb | 0.05 | 0.52 | 0.43 | 0 | 65 | 95 | |
| 1.8 | | | Nb | 0.05 | 0.52 | 0.43 | 0.20 | 65 | 12 | |
| 1.9* | | | Nb | 0.02 | 0.51 | 0.47 | 0 | 78 | 90 | 980 |
| 1.10 | | | Nb | 0.02 | 0.51 | 0.47 | 0.25 | 79 | 13 | 1,550 |
| 1.11* | Ca | 0.1 | Nb | 0.02 | 0.51 | 0.47 | 0 | 65 | 93 | |
| 1.12 | Ca | 0.1 | Nb | 0.02 | 0.51 | 0.47 | 0.15 | 66 | 21 | |
| 1.13* | Sr | 0.1 | Nb | 0.02 | 0.51 | 0.47 | 0 | 68 | 95 | |
| 1.14 | Sr | 0.1 | Nb | 0.02 | 0.51 | 0.47 | 0.13 | 68 | 19 | |
| 1.15* | Ba | 0.1 | Nb | 0.02 | 0.51 | 0.47 | 0 | 63 | 101 | |
| 1.16 | Ba | 0.1 | Nb | 0.02 | 0.51 | 0.47 | 0.16 | 63 | 30 | |
| 1.17* | | | Sb | 0.05 | 0.47 | 0.48 | 0 | 70 | 90 | 1,030 |
| 1.18 | | | Sb | 0.05 | 0.47 | 0.48 | 0.35 | 72 | 11 | 1,600 |
| 1.19* | | | Sb | 0.02 | 0.51 | 0.47 | 0 | 80 | 80 | |
| 1.20 | | | Sb | 0.02 | 0.51 | 0.47 | 0.50 | 80 | 8 | |
| 1.21* | | | Ta | 0.02 | 0.51 | 0.47 | 0 | 80 | 85 | |
| 1.22 | | | Ta | 0.02 | 0.51 | 0.47 | 0.44 | 81 | 9 | |
| 1.23* | | | Ta | 0.05 | 0.49 | 0.46 | 0 | 71 | 85 | |
| 1.24 | | | Ta | 0.05 | 0.49 | 0.46 | 0.2 | 71 | 11 | |

In Table 2, the samples indicated by sample number with an asterisk are solid solution ceramics of $$Pb(Li_{1/4}M_{3/4})O_3\text{-}PbZrO_3\text{-}PbTiO_3$$

system (where M is either Nb, Ta, or Sb) or of the same system with part of Pb substituted by Ca, Sr and Ba, none of these containing $Cr_2O_3$. This note is similarly applied to the succeeding examples. From Table 2, it is apparent that K*r* is markedly large and Q*m* is as small as 85 for the asterisked samples.

However, when $Cr_2O_3$ is incorporated by thermal diffusion into the ceramics, Q*m* is considerably reduced with an unchanged or increased value of K*r*.

It is quite apparent that the mechanical strength is considerably increased when $Cr_2O_3$ is incorporated by thermal diffusion (note Samples 1.10 and 1.18).

Example 2

Table 3 shows the results of experiments on solid solution ceramics expressed by the formula $$(Pb_{1-t'}M'_{t'})[(Fe_{1/3}M_{2/3})_{u'}Zr_{v'}Ti_{w'}]O_3$$

where M' is Ca, Sr, or Ba, and M is Nb, or Sb; $(u'+v'+w'=1)$ into which $Cr_2O_3$ was incorporated by thermal diffusion.

In this embodiment, $Fe_2O_3$ is used in terms of weight of FeO as the starting material of Fe.

TABLE 3

| Sample No. | M' | t' | M | u' | v' | w' | Amount of $Cr_2O_3$ incorporated (x wt. percent) | Kr (percent) | Qm | Mechanical strength (kg./cm.²) |
|---|---|---|---|---|---|---|---|---|---|---|
| 2.1* | | | Nb | 0.01 | 0.51 | 0.48 | 0 | 52 | 105 | |
| 2.2 | | | Nb | 0.01 | 0.51 | 0.48 | 0.3 | 52 | 30 | |
| 2.3* | | | Nb | 0.20 | 0.47 | 0.33 | 0 | 54 | 105 | |
| 2.4 | | | Nb | 0.20 | 0.47 | 0.33 | 0.25 | 55 | 35 | |
| 2.5* | | | Nb | 0.20 | 0.42 | 0.38 | 0 | 58 | 95 | 1,050 |
| 2.6 | | | Nb | 0.20 | 0.42 | 0.38 | 0.35 | 59 | 21 | 1,530 |
| 2.7* | | | Nb | 0.05 | 0.52 | 0.43 | 0 | 65 | 90 | |
| 2.8 | | | Nb | 0.05 | 0.52 | 0.43 | 0.5 | 66 | 15 | |
| 2.9* | | | Nb | 0.05 | 0.49 | 0.46 | 0 | 68 | 90 | |
| 2.10 | | | Nb | 0.05 | 0.49 | 0.46 | 0.3 | 68 | 20 | |
| 2.11* | | | Sb | 0.05 | 0.52 | 0.43 | 0 | 65 | 90 | 980 |
| 2.12 | | | Sb | 0.05 | 0.52 | 0.43 | 0.05 | 65 | 18 | 1,620 |
| 2.13* | | | Sb | 0.02 | 0.51 | 0.47 | 0 | 77 | 95 | |
| 2.14 | | | Sb | 0.02 | 0.51 | 0.47 | 0.1 | 79 | 11 | |
| 2.15* | Ca | 0.1 | Sb | 0.02 | 0.51 | 0.47 | 0 | 75 | 103 | |
| 2.16 | Ca | 0.1 | Sb | 0.02 | 0.51 | 0.47 | 0.2 | 76 | 20 | |
| 2.17* | Sr | 0.1 | Sb | 0.02 | 0.51 | 0.47 | 0 | 71 | 103 | |
| 2.18 | Sr | 0.1 | Sb | 0.02 | 0.51 | 0.47 | 0.1 | 75 | 9 | |
| 2.19* | Ba | 0.1 | Sb | 0.02 | 0.51 | 0.47 | 0 | 64 | 90 | |
| 2.20 | Ba | 0.1 | Sb | 0.02 | 0.51 | 0.47 | 0.15 | 64 | 8 | |

The above results indicate that the compound of this invention is highly practical when used as wideband filter elements.

In the $Pb(Li_{1/4}M_{3/4})O_3$-$PbZrO_3$-$PbTiO_3$ system solid solution (where M may be Nb, Ta, or Sb), the effective range in which the value of K*r* is maintained above 50% is given in terms of *t*, *u*, *v*, *w* and *x* as indicated below when the ceramics are expressed by the formula $$(Pb_{1-t}M'_t)[(Li_{1/4}M_{3/4})_uZr_vTi_w]O_3+x$$

wt. percent $Cr_2O_3$ (where M' is Ca, Sr, or Ba, and M: Nb, Ta, or Sb).

$$0 \leqq t \leqq 0.15$$
$$0.01 \leqq u \leqq 0.20$$
$$0.37 \leqq v \leqq 0.52$$
$$0.34 \leqq w \leqq 0.48$$
$$0.05 \leqq x \leqq 0.5$$

Outside this range, the value of K*r* is decreased, and the effect of expanding the bandwidth of filter is small, even if Q*m* is reduced. In other words, the effective range according to this invention should preferably be as specified above. In the succeeding examples, the effective range is defined on the same basis. It is to be noted that the amount of *x* of $Cr_2O_3$ mentioned in this and the succeeding examples is of an average value, that is a ratio of the total amount by weight of $Cr_2O_3$ finally contained in a sample to the weight of the sample.

If $Cr_2O_3$ is not incorporated in the ceramics by diffusion, the value of K*r* is very large. However, the value of Q*m* cannot be reduced to below about 90. When $Cr_2O_3$ is incorporated, the value of Q*m* is remarkably reduced with an unchanged or increased value of K*r*. Thus, these materials can be used as an excellent wideband filter element.

It is apparent that the mechanical strength is considerably increased by virtue of the presence of $Cr_2O_3$ (note Sample No. 2.12).

The compositional range where the value of K*r* is maintained above 50% is given below in terms of *t'*, *u'*, *v'*, *w'* and *x'*.

$$0 \leqq t' \leqq 0.15$$
$$0.01 \leqq u' \leqq 0.20$$
$$0.42 \leqq v' \leqq 0.52$$
$$0.33 \leqq w' \leqq 0.48$$
$$0.05 \leqq x' \leqq 0.50$$

Example 3

Solid solution ceramics expressed by the formula $$(Pb_{1-t'}M'_{t'})\{(Ni_{1/3}Nb_{2/3})_{u''}Zr_{v''}Ti_{w''}\}O_3$$

(where M' is Ca, Sr, or Ba; $u''+v''+w''=1$) were used, into which $Cr_2O_3$ was incorporated by thermal diffusion. Table 4 shows the relations among the quantity of incorporated $Cr_2O_3$, K*r*, Q*m* and mechanical strength.

TABLE 4

| Sample No. | M' | t | u'' | v'' | w'' | Amount of $Cr_2O_3$ incorporated (x'' wt. percent) | Kr (percent) | Qm | Mechanical strength (kg./cm.²) |
|---|---|---|---|---|---|---|---|---|---|
| 3.1* | | | 0.35 | 0.30 | 0.35 | 0 | 62 | 80 | |
| 3.2 | | | 0.35 | 0.30 | 0.35 | 0.5 | 62 | 9 | |
| 3.3* | | | 0.84 | 0.40 | 0.26 | 0 | 50 | 95 | |
| 3.4 | | | 0.84 | 0.40 | 0.26 | 0.4 | 50 | 13 | |
| 3.5* | | | 0.50 | 0.10 | 0.40 | 0 | 54 | 80 | 930 |
| 3.6 | | | 0.50 | 0.10 | 0.40 | 0.5 | 55 | 9 | 1,500 |
| 3.7* | | | 0.55 | 0.15 | 0.30 | 0 | 52 | 70 | |
| 3.8 | | | 0.55 | 0.15 | 0.30 | 0.45 | 55 | 8 | |
| 3.9* | | | 0.40 | 0.23 | 0.37 | 0 | 69 | 65 | 1,080 |
| 3.10 | | | 0.40 | 0.23 | 0.37 | 0.2 | 69 | 13 | 1,550 |
| 3.11* | Ca | 0.1 | 0.40 | 0.23 | 0.37 | 0 | 61 | 70 | |
| 3.12 | Ca | 0.1 | 0.40 | 0.23 | 0.37 | 0.25 | 61 | 21 | |
| 3.13* | Sr | 0.1 | 0.40 | 0.23 | 0.37 | 0 | 58 | 77 | |
| 3.14 | Sr | 0.1 | 0.40 | 0.23 | 0.37 | 0.35 | 59 | 19 | |
| 3.15* | Ba | 0.1 | 0.40 | 0.23 | 0.37 | 0 | 58 | 55 | |
| 3.16 | Ba | 0.1 | 0.40 | 0.23 | 0.37 | 0.3 | 59 | 14 | |

Table 4 indicates the fact that in the ceramics in which the $Cr_2O_3$ was omitted, the value of K*r* is increased and the value of Q*m* is decreased.

Whereas, when $Cr_2O_3$ is incorporated thereinto by thermal diffusion, the value of Q*m* is remarkably reduced with an unchanged or increased value of K*r*. At the same time, the mechanical strength is considerably increased (note Sample Nos. 3.6 and 3.10).

The compositional range where the value of K*r* is maintained above 50% is given below in terms of $t''$, $u''$, $v''$, $w''$ and $x''$.

$$0 \leqq t'' \leqq 0.15$$
$$0.35 \leqq u'' \leqq 0.84$$
$$0.10 \leqq v'' \leqq 0.30$$
$$0.30 \leqq w'' \leqq 0.40$$
$$0.05 \leqq x'' \leqq 0.50$$

Example 4

Solid solution ceramics expressed by the formula $$(Pb_{1-u'''-t'''}Bi_{u'''}M'_{t'''})[Li_{1/2}M_{1/2})_{u'''}Zr_{v'''}Ti_{w'''}]O_3$$

(where M is Nb, Sb, or Ta, and M' is Ca, Sr, or Ba; $u'''+v'''+w'''=1$) were used, into which $Cr_2O_3$ was incorporated by thermal diffusion. Table 5 shows the relationship among the quantity of $Cr_2O_3$ incorporated, K*r*, Q*m* and mechanical strength.

Example 4

Solid solution ceramics expressed by the formula $$(Pb_{1-u'''-t'''}Bi_{u'''}M'_{t'''})[Li_{1/2}M_{1/2})_{u'''}Zr_{v'''}Ti_{w'''}]O_3$$

(where M is Nb, Sb, or Ta, and M' is Ca, Sr, or Ba; $u'''+v'''+w'''=1$) were used, into which $Cr_2O_3$ was incorporated by thermal diffusion. Table 5 shows the relationship among the quantity of $Cr_2O_3$ incorporated, K*r*, Q*m* and mechanical strength.

TABLE 5

| Sample No. | M' | t''' | M | u''' | v''' | w''' | Amount of $Cr_2O_3$ incorporated (x''' wt. percent) | K*r* (percent) | Q*m* | Mechanical strength (kg/cm²) |
|---|---|---|---|---|---|---|---|---|---|---|
| 4.1* | | | Nb | 0.10 | 0.45 | 0.45 | 0 | 61 | 49 | |
| 4.2 | | | Nb | 0.10 | 0.45 | 0.45 | 0.35 | 65 | 12 | |
| 4.3* | | | Nb | 0.15 | 0.425 | 0.425 | 0 | 53 | 34 | 970 |
| 4.4 | | | Nb | 0.15 | 0.425 | 0.425 | 0.4 | 56 | 9 | 1,630 |
| 4.5* | Ca | 0.1 | Nb | 0.10 | 0.45 | 0.45 | 0 | 58 | 55 | |
| 4.6 | Ca | 0.1 | Nb | 0.10 | 0.45 | 0.45 | 0.4 | 58 | 8 | |
| 4.7* | Sr | 0.1 | Nb | 0.10 | 0.45 | 0.45 | 0 | 58 | 62 | |
| 4.8 | Sr | 0.1 | Nb | 0.10 | 0.45 | 0.45 | 0.38 | 58 | 12 | |
| 4.9* | Ba | 0.1 | Nb | 0.10 | 0.45 | 0.45 | 0 | 54 | 53 | |
| 4.10 | Ba | 0.1 | Nb | 0.10 | 0.45 | 0.45 | 0.5 | 55 | 11 | |
| 4.11* | | | Ta | 0.10 | 0.45 | 0.45 | 0 | 61 | 54 | 1,200 |
| 4.12 | | | Ta | 0.10 | 0.45 | 0.45 | 0.35 | 62 | 12 | 1,850 |
| 4.13* | | | Ta | 0.06 | 0.47 | 0.47 | 0 | 51 | 65 | |
| 4.14 | | | Ta | 0.06 | 0.47 | 0.47 | 0.3 | 53 | 10 | |

As shown in Table 5, when no $Cr_2O_3$ is incorporated, the value of K*r* is large, while the value of Q*m* is not reduced below 34. Whereas, when $Cr_2O_3$ is incorporated by diffusion, the value of Q*m* is markedly reduced with an unchanged or increased value of K*r*. The mechanical strength is considerably increased.

The compositional range where the value of K*r* is maintained above 50% is given as follows in terms of $t'''$, $u'''$, $v'''$, $w'''$ and $x'''$.

$$0 \leqq t''' \leqq 0.15$$
$$0.10 \leqq u''' \leqq 0.15$$
$$0.425 \leqq v''' \leqq 0.47$$
$$0.425 \leqq w''' \leqq 0.45$$
$$0.05 \leqq x''' \leqq 0.5$$

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of improving the piezoelectric properties of ceramics consisting essentially of the following composition:

$$uPb(Li_{1/4}M_{3/4})O_3\text{-}vPbZrO_3\text{-}wPbTiO_3$$

where M represents an element selected from the group consisting of Nb, Ta and Sb and *u*, *v* and *w* represent a set of mol ratios having the following relation:

$$0.01 \leqq u \leqq 0.20$$
$$0.37 \leqq v \leqq 0.52$$
$$0.34 \leqq w \leqq 0.48$$
$$u+v+w=1.00$$

comprising the step of incorporating Cr into said ceramics by thermal diffusion to the extent that said ceramics contain $Cr_2O_3$ in an amount of about 0.05 to 0.5% by weight of said ceramics.

2. The method of claim 1, in which $Cr_2O_3$ is used as a source of Cr diffusion in said incorporation step.

3. The method of claim 1, in which said incorporating step comprises contacting said ceramics with $Cr_2O_3$ and then heating said ceramics and $Cr_2O_3$ at about 900 to 1300° C. in an oxidizing or inert atmosphere for a time sufficient for said ceramics to contain $Cr_2O_3$ in an amount of about 0.05 to 0.5% by weight of said ceramics.

4. A method of improving the piezoelectric properties of ceramics consisting essentially of the following composition:

$$u'Pb(Fe_{1/3}M_{2/3})O_3\text{-}v'PbZrO_3\text{-}w'PbTiO_3$$

where M represents an element selected from the group consisting of Nb and Sb, and *u'*, *v'* and *w'* represent a set of mol ratios having the following relation:

$$0.01 \leqq u' \leqq 0.2$$
$$0.42 \leqq v' \leqq 0.52$$
$$0.33 \leqq w' \leqq 0.48$$
$$u'+v'+w'=1.00$$

comprising the step of incorporating Cr into said ceramics by thermal diffusion to the extent that said ceramics contain $Cr_2O_3$ in an amount of about 0.05 to 0.5% by weight of said ceramics.

5. The method of claim 4, in which said incorporating step comprises contacting said ceramics with $Cr_2O_3$ and heating said ceramics and the $Cr_2O_3$ at about 900 to 1300° C. in an oxidizing or inert atmosphere for a time sufficient for said ceramics to contain $Cr_2O_3$ in an amount of about 0.05 to 0.5% by weight of said ceramics.

6. A method of improving the piezoelectric properties of ceramics consisting essentially of the following composition:

$$u''Pb(Ni_{1/3}Nb_{2/3})O_3\text{-}v''PbZrO_3\text{-}w''PbTiO_3$$

where *u''*, *v''* and *w''* represent a set of mol ratios having the following relation:

$$0.35 \leqq u'' \leqq 0.84$$
$$0.10 \leqq v'' \leqq 0.30$$
$$0.30 \leqq w'' \leqq 0.40$$
$$u''+v''+w''=1.00$$

comprising the step of incorporating Cr into said ceramics by thermal diffusion to the extent that said ceramics contain $Cr_2O_3$ in an amount of about 0.05 to 0.5% by weight of said ceramics.

7. The method of claim 6, in which said incorporating step comprises contacting said ceramics with $Cr_2O_3$ and heating said ceramics and said $Cr_2O_3$ at about 900 to 1300° C. in an oxidizing or inert atmosphere for a time sufficient for said ceramics to contain $Cr_2O_3$ in an amount of about 0.05 to 0.5% by weight of said ceramics.

8. A method for improving the piezoelectric properties of ceramics consisting essentially of the following composition:

$$u'''Bi(Li_{1/2}M_{1/2})O_3\text{-}v'''PbZrO_3\text{-}w'''PbTiO_3$$

where M represents an element selected from the group consisting of Nb, Ta and Sb and $u'''$, $v'''$ and $w'''$ represent a set of mol ratios having the following relation:

$$0.10 \leqq u''' \leqq 0.15$$
$$0.425 \leqq v''' \leqq 0.47$$
$$0.425 \leqq w''' \leqq 0.45$$
$$u'''+v'''+w'''=1.00$$

which comprises the step of incorporating Cr into said ceramics by thermal diffusion to the extent that said ceramics contain $Cr_2O_3$ in an amount of about 0.05 to 0.5% by weight of said ceramics.

9. The method of claim 8, in which said incorporating step comprises contacting said ceramics with $Cr_2O_3$ and heating said ceramics and $Cr_2O_3$ at about 900 to 1300° C. in an oxidizing or inert atmosphere for a time sufficient for said ceramics to contain $Cr_2O_3$ in an amount of about 0.05 to 0.5% by weight of said ceramics.

10. A method of improving the piezoelectric properties of a ceramic body consisting essentially of a composition selected from the group consisting of (A) $(Pb_{1-t}M'_t)[(Li_{1/4}M_{3/4})_uZr_vTi_w]O_3$ where M is selected from the group consisting of Nb, Ta and Sb and M' is selected from the group consisting of Ca, Sr and Ba and $t$, $u$, $b$ and $w$ satisfy the following relation:

$$0 \leqq t \leqq 0.15$$
$$0.01 \leqq u \leqq 0.20$$
$$0.37 \leqq v \leqq 0.52$$
$$0.34 \leqq w \leqq 0.48$$
$$u+v+w=1.00$$

(B) $(Pb_{1-t'}M'_{t'})[(Fe_{1/3}M_{2/3})_{u'}Zr_{v'}Ti_{w'}]O_3$ where M is selected from the group consisting of Nb and Sb, and M' is selected from the group consisting of Ca, Sr and Ba, and $t'$, $u'$, $v'$ and $w'$ satisfy the following relations:

$$0 \leqq t' \leqq 0.15$$
$$0.01 \leqq u' \leqq 0.2$$
$$0.42 \leqq v' \leqq 0.52$$
$$0.33 \leqq w' \leqq 0.48$$
$$u'+v'+w'=1.00$$

(C) $(Pb_{1-t''}M'_{t''})\{(Ni_{1/3}Nb_{2/3})_{u''}Zr_{v''}Ti_{w''}\}O_3$ where M' is selected from the group consisting of Ca, Sr and Ba, and $t''$, $u''$, $v''$ and $w''$ satisfy the following relation:

$$0 \leqq t'' \leqq 0.15$$
$$0.35 \leqq u'' \leqq 0.84$$
$$0.10 \leqq v'' \leqq 0.30$$
$$0.30 \leqq w'' \leqq 0.40$$
$$u''+v''+w''=1.00$$

and (D) $(Pb_{1-u'''-t'''}Bi_{u'''}M'_{t'''})[(Li_{1/2}M_{1/2})_{u'''}Zr_{v'''}Ti_{w'''}]O_3$ where M is selected from the group consisting of Nb, Sb, Ra, and M' is selected from the group consisting of Ca, Sr and Ba, and $t'''$, $u'''$, $v'''$, and $w'''$ satisfy the following relation:

$$0 \leqq t''' \leqq 0.15$$
$$0.10 \leqq u''' \leqq 0.15$$
$$0.425 \leqq v''' \leqq 0.47$$
$$0.425 \leqq w''' \leqq 0.45$$
$$u'''+v'''+w'''=1.00$$

which comprises the step of thermally diffusing Cr into said ceramic body to the extent that said ceramic body contains $Cr_2O_3$ in an amount of 0.05 to 0.5% by weight of said ceramic body.

11. The method of claim 10, in which $Cr_2O_3$ is used as a source of the Cr diffusion in said diffusing step.

12. The method of claim 11, in which said diffusion step comprises contacting said ceramic body with $Cr_2O_3$ and heating said ceramic body and $Cr_2O_3$ at about 900 to 1300° C. in an oxidizing or inert atmosphere for a time sufficient for said ceramic body to contain $Cr_2O_3$ in an amount of about 0.05 to 0.5% by weight of said ceramic body.

13. The method of claim 11, in which said diffusion step comprises covering the surface of said ceramic body with a powder comprising $Cr_2O_3$ and heating said ceramic body and said powder at about 1000 to 1200° C. in air for a time sufficient for said ceramic body to contain $Cr_2O_3$ in an amount of about 0.05 to 0.5% by weight of said ceramic body.

14. The method of claim 10, in which said diffusion step comprises diffusing Cr from a vapor phase in an oxidizing atmosphere.

References Cited

UNITED STATES PATENTS

| | | | |
|---|---|---|---|
| 3,518,199 | 6/1970 | Tsubouchi et al. | 252—62.9 |
| 3,595,795 | 7/1971 | Tsubouchi et al. | 252—62.9 |
| 3,637,506 | 1/1972 | Tanizake et al. | 252—62.9 |

FOREIGN PATENTS

| | | | |
|---|---|---|---|
| 814,506 | 6/1969 | Canada | 252—62.9 |
| 1,926,812 | 2/1970 | Germany | 252—62.9 |

OTHER REFERENCES

Takanashi et al.: Japan J. Appl. Phys. 9 (1970), p. 1006.

EARL C. THOMAS, Primary Examiner

J. COOPER, Assistant Examiner